(12) United States Patent
Delatorre

(10) Patent No.: US 7,083,153 B1
(45) Date of Patent: Aug. 1, 2006

(54) SYSTEM FOR ORGANIZING A COMPUTER MONITOR

(76) Inventor: Paul G. Delatorre, 3456 Shiloh Rd., Tyler, TX (US) 75707

( * ) Notice: Subject to any disclaimer, the term of this patent is extended or adjusted under 35 U.S.C. 154(b) by 61 days.

(21) Appl. No.: 10/800,514

(22) Filed: Mar. 15, 2004

Related U.S. Application Data

(60) Provisional application No. 60/460,119, filed on Apr. 3, 2003.

(51) Int. Cl.
*A47F 5/00* (2006.01)

(52) U.S. Cl. .............. 248/309.1; 248/205.3; 248/442.2; 248/918

(58) Field of Classification Search ........... 248/442.2, 248/205.3, 918, 174, 309.1; 40/594, 124; 211/50; 434/365; 400/718; 361/683; 312/234, 312/7.2
See application file for complete search history.

(56) References Cited

U.S. PATENT DOCUMENTS

| | | | | |
|---|---|---|---|---|
| 1,052,046 A * | 2/1913 | Elliott | ............ | 400/717 |
| 1,221,369 A * | 4/1917 | Osborn | .............. | 248/442.2 |
| 3,168,275 A * | 2/1965 | Grondin | .............. | 248/205.3 |
| 4,511,111 A * | 4/1985 | Godfrey et al. | ............ | 248/459 |
| 4,848,710 A * | 7/1989 | Newman | .............. | 248/129 |
| 4,869,565 A | 9/1989 | Bachman | .............. | 312/234 |
| 5,074,512 A * | 12/1991 | Gianforcaro et al. | .... | 248/442.2 |
| 5,104,086 A * | 4/1992 | Ramey et al. | ........... | 248/442.2 |
| 5,104,087 A | 4/1992 | Wentzloff | ............ | 348/442.2 |
| 5,328,145 A | 7/1994 | Charapich | .............. | 248/442.2 |
| 5,383,642 A * | 1/1995 | Strassberg | .............. | 248/442.2 |
| 5,549,267 A | 8/1996 | Armbruster | .............. | 248/442.2 |
| 5,638,096 A | 6/1997 | Schwartz | .............. | 248/442.2 |
| 6,299,111 B1 * | 10/2001 | Brothers | ............ | 248/51 |
| 6,430,856 B1 | 8/2002 | Schwartz | .............. | 40/642.01 |
| 6,686,900 B1 | 2/2004 | Levy | .............. | 345/156 |
| 2004/0144900 A1 * | 7/2004 | Sheppard | .............. | 248/118 |
| 2004/0227048 A1 * | 11/2004 | Lom et al. | .............. | 248/442.2 |

* cited by examiner

*Primary Examiner*—Korie Chan
(74) *Attorney, Agent, or Firm*—Buskop Law Group, P.C.; Wendy Buskop

(57) ABSTRACT

The system for organizing a computer monitor includes an upper portion and a lower portion. The upper portion has a central body having a C-shape for engaging the upper portion of the computer monitor without impairing computer monitor viewing; a left arm fastened to the central body; a right arm fastened to the central body; a bottom caddy having a modified Z-shape for sliding engaging the lower portion of the computer monitor and adapted for holding desk implements and consisting of a strengthening side connected to an attaching side a front face connected to the attaching side and a lip; and an adhesive for attaching the bottom caddy to the lower portion of the computer monitor and an adhesive to attaching the central body to the upper portion of the computer monitor.

16 Claims, 6 Drawing Sheets

SYSTEM FOR ORGANIZING A COMPUTER MONITOR

The present application claims priority to co-pending U.S. Provisional Patent Application Ser. No. 60/460,119 filed on Apr. 3, 2003, entitled, "System for Organizing a Computer Monitor".

FIELD

The present embodiments relate to a system for organizing post it notes, messages, and utilitarian or decorative items around a computer monitor.

BACKGROUND

Many people need to write quick messages or reminders while using their computers. These messages may relate to what they are doing on the computer, such as writing a document or working in a program. The messages may also include notes received from colleagues verbally or on the phone while working on or near the computer.

Most people write these messages on a scrap piece of paper, or a sticky note (i.e. 3M's Post-It Note™) that they may attach to their monitor or computer. These notes waste paper and valuable desk space, they are also easily lost.

A few existing inventions involve attaching bulletin and write boards to computer monitors, and computer monitors only; however, the previous inventions are not designed for convenience, functionality, and easy installation. In addition, some of these previous inventions disrupt the use of the computer.

Other apparatus allow utilitarian or decorative items to be attached to the computer display device are described in Bachman U.S. Pat. No. 4,869,565; Wentzloff U.S. Pat. No. 5,104,087; Charapich U.S. Pat. No. 5,328,145; Ambruster U.S. Pat. No. 5,549,267; Schwartz U.S. Pat. No. 5,638,096; Schwartz U.S. Pat. No. 6,430,856; and Levy U.S. Pat. No. 6,686,900. These references are herby incorporated by reference into the current application.

The main problem with the current art is that the apparatus are rather large and difficult to package, to store, and to transport. A need exists for a system that is collapsible in order to store easily and still provides space for utilitarian or decorative items to be attached to the computer monitor.

SUMMARY

The system for organizing a computer monitor includes an upper portion and a lower portion. The upper portion is a central body with a C-shape for engaging the upper portion of the computer monitor without impairing computer monitor viewing. The upper portion also a left arm fastened to the central body and a right arm fastened to the central body.

The bottom caddy has a modified Z-shape for engaging the lower portion of the computer monitor. The bottom caddy is adapted to hold desk implements and consisting of a strengthening side connected to an attaching side a front face connected to the attaching side and a lip and an adhesive for attaching the bottom caddy to the lower portion of the computer monitor. An adhesive is also used to engage the central body to the upper portion of the computer monitor. The central body can also house a left and right slide adapted for holding messages.

BRIEF DESCRIPTION OF THE DRAWINGS

The present embodiments will be explained in greater detail with reference to the appended Figures.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular embodiments and that it can be practiced or carried out in various ways.

The present embodiments relate to a system and apparatus for organizing a computer monitor and work area.

One of the features of the system is that the system is collapsible. As a collapsible unit, the system has the advantage of being easy to package, easy and inexpensive to transport as can lay flat in a small box, therefore, making the system easy to store and easy to send through the mail.

Figure 1:
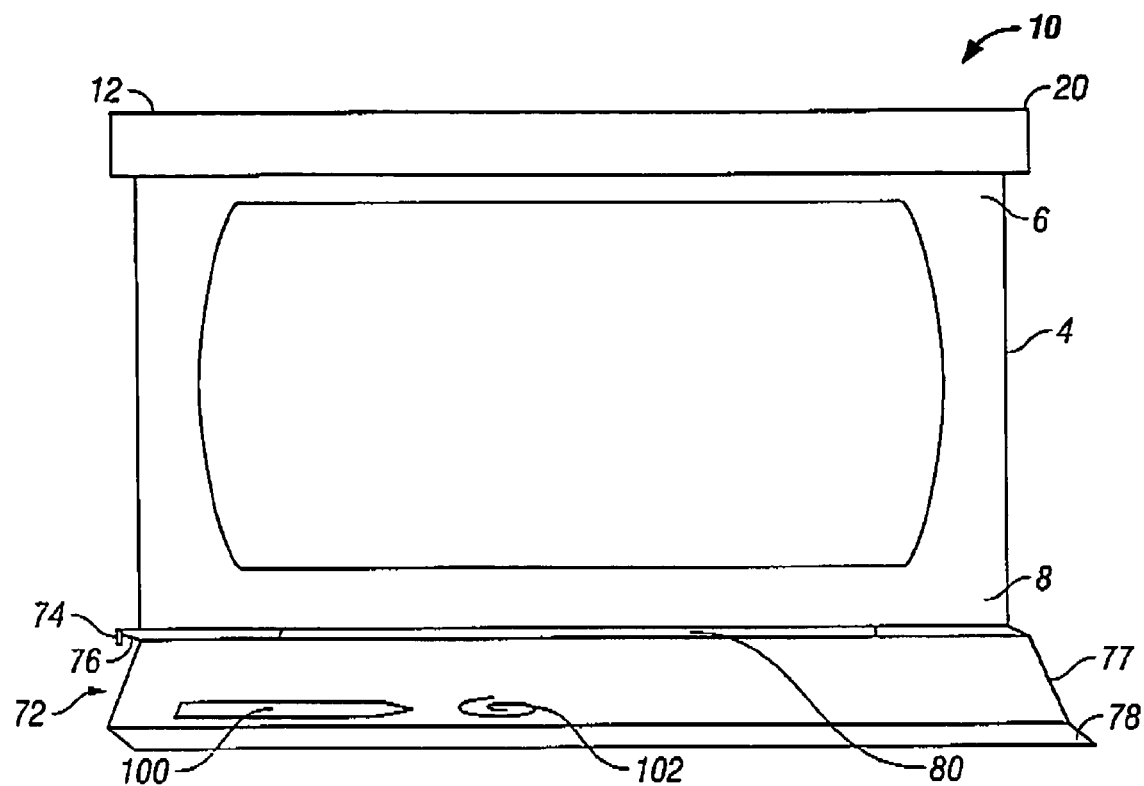
FIG. 1 depicts a front view of the system in the preferred embodiment attached to a computer monitor.

With reference to the figures, in FIG. 1, the system for organizing a computer monitor 4 includes a monitor upper portion 6 and a monitor lower portion 8. FIG. 1 depicts a front view of the system in the preferred embodiment attached to a computer monitor.

The organizer upper portion 10 is made of a central body 12 having a C-shape construction for engaging an upper portion 6 of the computer monitor 4 without impairing computer monitor viewing.

The central body 12 has a right arm 20 and a left arm 14 not shown in detail in FIG. 1 but detailed in later figures. Both the right arm and the left arm are connected to the central body 12 such as with studs and nuts or other fastening means, such as a clip, a cotter pin, or a stud and nut configuration. Adhesive can be used to connect the central body to the computer or the central body and simply slide over the computer monitor and hold onto the screen frame of the monitor.

A bottom caddy 72 is part of this easy to use and inexpensive to ship system for organizing a computer. The bottom caddy preferably has a modified Z-shape for engaging the lower portion 8 of the computer monitor. The bottom caddy is adapted for holding desk implements that can be and number of implements. In FIG. 1, the examples shown include a pen 100 and paperclip 102 but other related items can be placed in this caddy, such as a calculator, rubber bands, and so on.

The bottom caddy consists of a strengthening side 74 connected to an attaching side 76 a front face 77 connected to the attaching side 76 and a lip 78.

An adhesive 80 is used for attaching the bottom caddy 72 to the lower portion 8 of the computer monitor.

Preferred adhesives usable in with the systems can be 3M double sided tape, which preferably is a synthetic adhesive, and a white, closed cell acrylic foam carrier, known as part number 4932 from the 3M Company of Minnesota.

Other adhesives could be used to secure the bottom caddy and the central body to the monitor. The adhesives enable the user to remove the bottom caddy and/or the central body from the computer monitor without damaging the computer monitor.

The bottom caddy is contemplated to be usable for holding a variety of other office tools. Desk tools include post it notes, pencils, cell phones, business cards, car keys and combinations thereof.

The system can be constructed of a non-magnetic metal, like aluminum, plastic, or plastic composite. The plastic system is made using a molding method. The system can be painted using powder-coat paint, a fiber coating paint, spray painted, or covered by regular paint.

Figure 2:
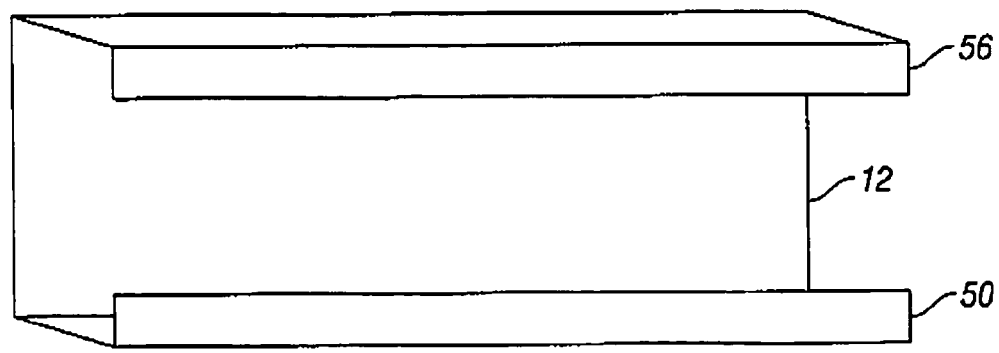
FIG. 2 depicts a back view of the central body showing the back lip.

FIG. 2 shows the central body 12 from a back view wherein the central body is connected to the back lip 56. This back lip 56 is used for holding the right or the left slides within the C-shape of the central body, yet permit the slides to move from a stored position within the C-shape to a deployed position beyond the body of the central body. The right and left slides have an important optional use. The right slide 64, depicted in FIG. 3, can be used for holding post it notes, additional advertising for the provider of the organizing system or providing a surface onto which useful tools, like a ruler can be silk screened.

Figure 3:
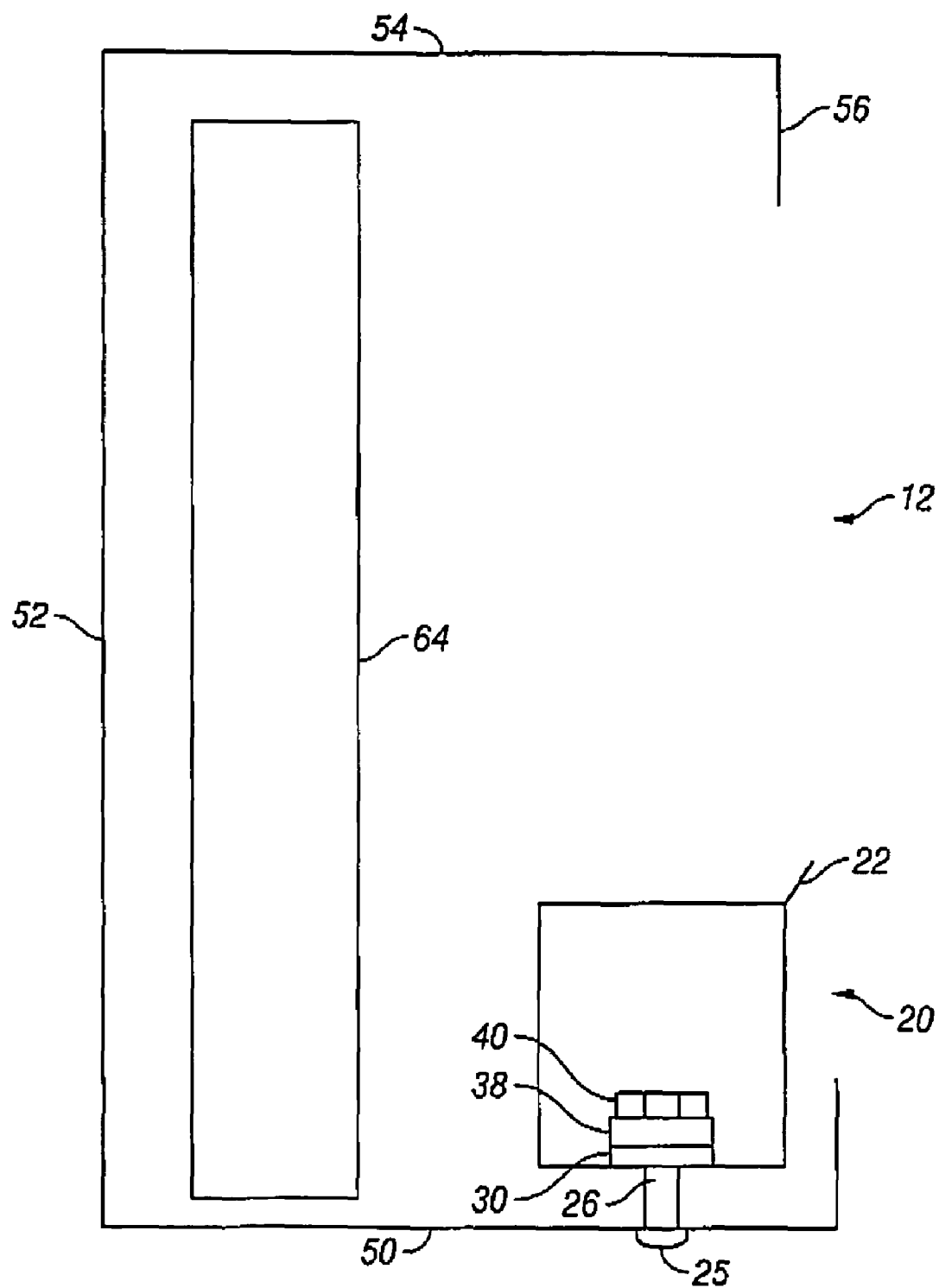
FIG. 3 depicts a side view of the central body containing a slide and at least one arm in the folded position.

FIG. 3 shows the central body 12 from a side view wherein the central body contains a right slide 64. This view shows that the central body 12 is connected to the right arm 20. In this view, the central body is shown having the back lip 56, top side 54 connected to the back lip. A front side 52 engages the top side and a bottom side 50. The right arm 20 is connected at the right arm first end 22 to the central body 12 on the bottom side 50 preferably using a right arm fastener 25 that is for pivotably engaging the right arm first end with the central body.

The right arm fastener 25 is made of a stud 26, a first right arm washer 30, a second right arm washer 38, and a nut 40.

The stud is preferably made of stainless steel, as is the nut. The washers are preferably made of a phenolic material, but could be rubber or an elastomeric material. In a preferred embodiment, the stud is an 8-32½ inch stud, preferably a PEM CLS 832-type stud.

The fastener enables the arm to swivel and pivot, but in a manner that enables the user to adjust the arms to a desired angle position and then maintain that angle.

Figure 4:
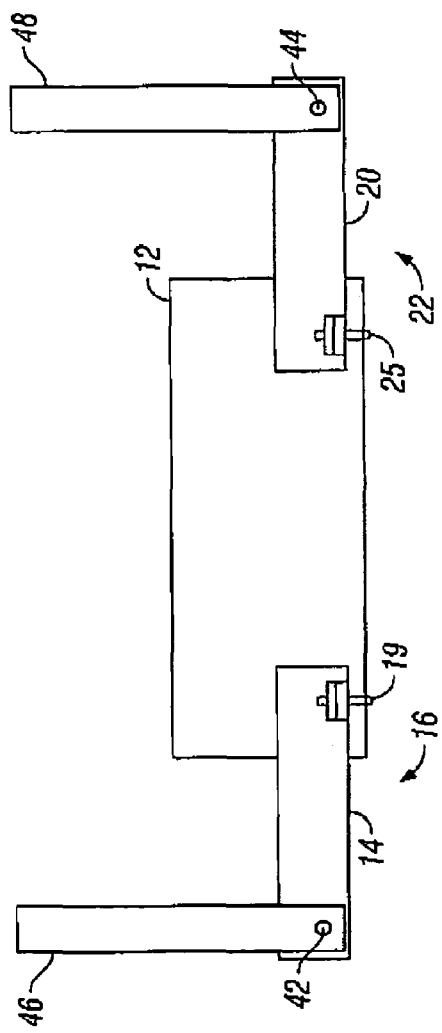
FIG. 4 depicts a back inside view of the central body with the right arm and the left arm secured to the body and oriented in an extended position.

FIG. 4 shows a back inside view of the central body 12 with the right arm 20 and the left arm 14 connected to the central body 12 yet both arms are in an extended position, unfolded position. When the arms are folded, the arms do not extend beyond the horizontal length of the central body.

In FIG. 4, the two sets of fasteners, the right arm fastener 25 and the left arm fastener 19 are shown. The right arm fastener 25 connects the right arm 20 to the central body 12 and the left arm fastener 19 connects the left arm 14 to the central body 12.

Each fastener is shown to be made of the stud, washer and nut combination previously described that enables the left and right arms to pivot about the studs while providing adequate tension enabling a user to position the arms at any desired angle from the central body without wobbling.

FIG. 4 also shows optional additional parts, the right arm holder 48 and the left arm holder 46 each connected by a rivet, the right arm rivet 44 and left arm rivet 42 respectively.

The left arm fastener 19 contemplated to be identical to for substantially similar to the right arm fastener with a stud, a plurality of washers and a nut.

Figure 5:
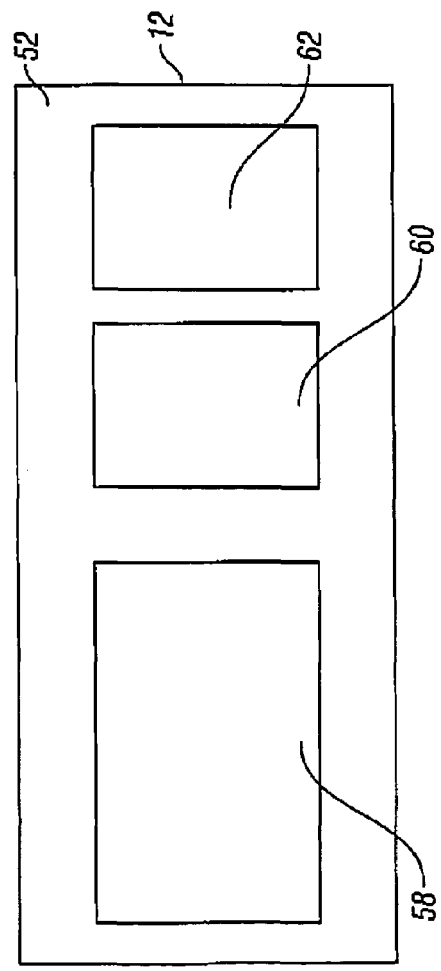
FIG. 5 depicts a front view of the central body with advertising, a mirror, and post-it notes disposed thereon.

FIG. 5 depicts a front view of the central body with advertising, a mirror, and post-it notes disposed thereon. In this embodiment, the front side 52 is depicted holding advertising 58, or a mirror 60 or post-it notes 62 or combinations of these on the front side of the central body 12.

As noted in FIG. 3, the central body can have at least one slide, and optionally two slides contained within the C-shape of the central body 12.

Figure 6:
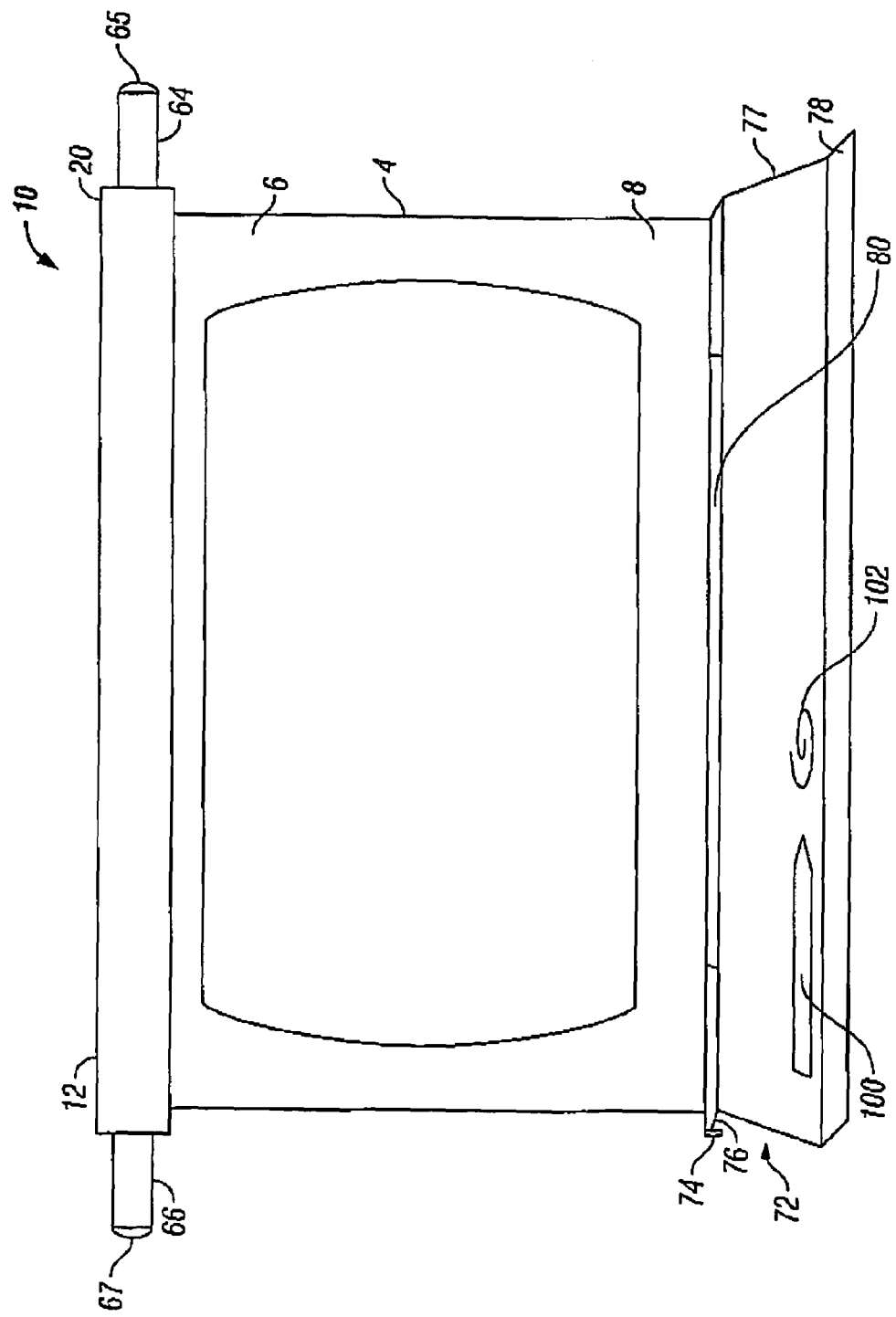
FIG. 6 depicts a front view of the two party system secured to a monitor on top and bottom with two slides deployed off of the central body.

FIG. 6 is a front view showing two partially deployed slides emanating from the central body. The two slides 64 and 66 each extend away from the sides of a computer monitor 4 and each slide's extension can be adjusted depending on the desires of the user. The right slide 64 optionally can have a right slide handle portion 65 on the right side of the slide. The left slide 66 can optionally have a left handle portion 67 to enable a user to easily move the slide.

Either or both slides can be used to hold additional messages. Optionally, one or more slides can be silk screened to look like a ruler or to support additional advertising.

Figure 7:
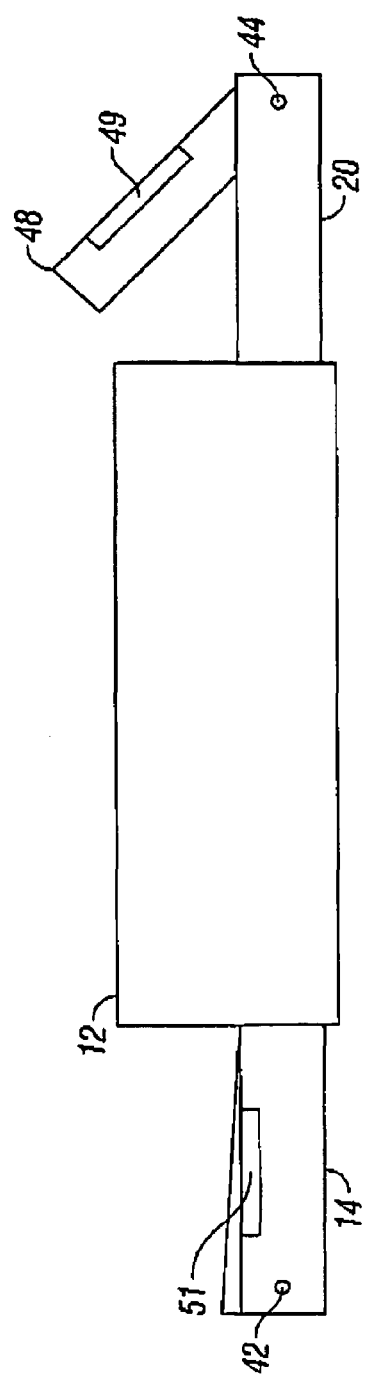
FIG. 7 depicts a front view of the central body with the right arm connected to a right arm holder further having a right arm holder clip connected by right arm rivet in a disconnected position and a left arm connected to a left arm holder further having a left arm holder clip in the holding position for securing paper.

FIG. 7 shows a front view of the central body 12 with the right arm 20 engaging right arm holder 48 with right arm holder clip 49 connected by right arm rivet 44 in a "not yet engaged" position. In contrast, FIG. 7 depicts left arm 14 connected by left arm rivet 42 to the left arm holder having the left arm holder clip 51 engaging the left arm 14 to hold papers by tension with the clip and the arm.

The right arms and the right holders are not identical to the left arms and the left holders, but in fact they are mirror images of each other.

Figure 8:
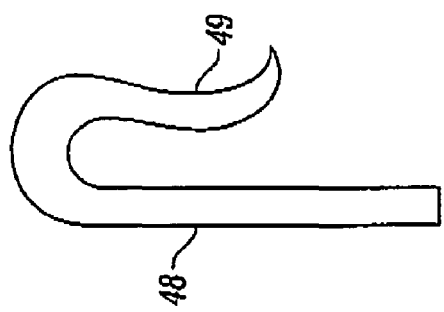
FIG. 8 depicts a side view detail of the right arm holder clip with the Y shape.

FIG. 8 shows a side view detail of the right arm holder clip 49 as engaging the right arm holder 48 and having a Y-shape for wedging over the right arm for securing papers.

Since the slides are at a fixed height when they extend from the central body, the height adjusting extension can be affixed to either slide to allow the user to self-adjust the height of papers or the like attached to the slides by the clips.

Figure 9:
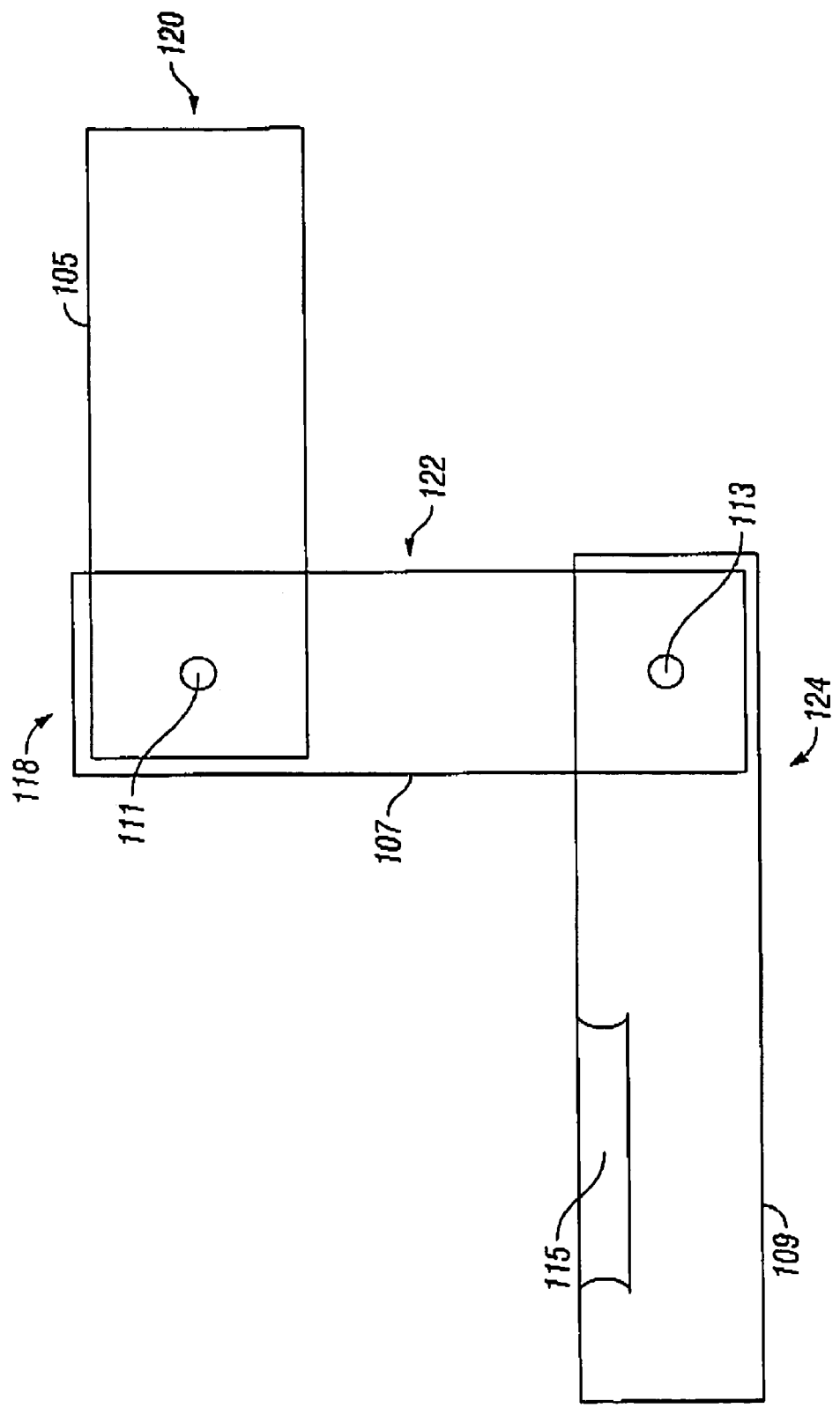
FIG. 9 depicts a detail the height adjuster having a three part construction which can be secured to the central body.

The right arm holder is contemplated to have a construction so that it can swivel with some tension from an in-use position to an out-of-use position FIG. 9 is a detailed view of the height adjusting extension. In this embodiment, a left segmented arm 105 having a first segment end 120 and a second segmented end 118 engages with a first segment 107 secured to the second segmented end 118 with a first segment fastener 111. The first segment has a top end 122 and a bottom end 124 and connects to a second segment 109 secured to the bottom end 124 with a second segment fastener 113 and a clip 115 for holding paper using tension.

The right segmented arm is not shown in the figure but is a mirror image of the left segmented arm wherein the right segmented arm has a first right segment end and a second right segmented end with a first right segment secured to the second right segmented end with a first right segment fastener, and wherein the first right segment has a right top end and a right bottom end and a right second segment secured to the right bottom end with a second right segment fastener and a right clip for holding paper.

As in the other embodiments, the system includes a bottom caddy having a modified Z-shape for sliding engaging the lower portion of the computer monitor and adapted for holding desk implements and consisting of a strengthening side connected to an attaching side a front face connected to the attaching side and a lip, and an adhesive for attaching the bottom caddy to the lower portion of the computer monitor.

While these embodiments have been described with emphasis on the preferred embodiments, it should be understood that within the scope of the appended claims the embodiments might be practiced or carried out in various ways other than as specifically described herein.

What is claimed is:

1. A system for organizing a computer monitor with an upper monitor portion and a lower monitor portion comprising:
   a. an upper support comprising:
      i. a central body comprising a C-shape and adapted for engaging the upper monitor portion without impairing computer monitor viewing;
      ii. a left arm comprising a left arm first end and a left arm second end;
      iii. a left arm fastener for pivotably engaging the left arm first end to the central body, wherein the left arm fastener comprises a stud, a plurality of washers, and a nut;
      iv. a right arm comprising a right arm first end and a right arm second end; and
      v. a right arm fastener for pivotably engaging the right arm first end to the central body, wherein the right arm fastener comprises a stud, a plurality of washers, and a nut;
   b. a top adhesive for attaching the upper support to the upper monitor portion;
   c. a bottom caddy comprising a modified Z-shape for engaging the lower monitor portion and adapted for holding desk tools and wherein the bottom caddy comprises:
      i. a strengthening side connected to an attaching side;
      ii. a front face connected to the attaching side; and
      iii. a lip connected to the front face;
   d. a bottom adhesive for attaching the bottom caddy to the lower monitor portion.

2. The system of claim 1, wherein the stud and the of the left arm fastener and right arm fastener nut are stainless steel.

3. The system of claim 1, wherein the plurality of washers of the left arm fastener and right arm fastener consist of a phenolic material.

4. The system of claim 1, wherein the fasteners enable the left arm and the right arm to pivot about the stud while providing adequate tension so that a user can position the arms at any desired angle.

5. The system of claim 1, wherein the left arm fastener comprises a left arm rivet, wherein the right arm fastener comprises a right arm rivet, wherein the left arm rivet engages a left arm holder to the left arm, and wherein the right arm rivet engages a right arm holder to the right arm.

6. The system of claim 1, wherein the central body comprises a front side comprising advertising.

7. The system of claim 1, wherein the central body comprises a front side adapted to receive and hold a mirror.

8. The system of claim 1, wherein the central body comprises a front side adapted to receive and hold post-it notes.

9. The system of claim 1, wherein the central body further comprises a left slide slidably contained within the C-shape and the left slide is adapted to receive and hold messages.

10. The system of claim 9, wherein the left side further comprises a handle.

11. The system of claim 1, wherein the top adhesive and the bottom adhesive are a double sided adhesive tape.

12. The system of claim 1, wherein the desk tools comprises post-it notes, pens, pencils, paper clips, rubber bands, calculators, cell phones, business cards, car keys and combinations thereof.

13. A system for organizing a computer monitor with an upper monitor portion and a lower monitor portion comprising:
   a. an upper support comprising:
      i. a central body comprising a C-shape and adapted for engaging the upper monitor portion without impairing computer monitor viewing, wherein the central body further comprises a right slide slidably contained within the C-shape, and wherein the right slide is adapted to receive and hold messages;
      ii. a left arm comprising a left arm first end and a left arm second end;
      iii. a left arm fastener for pivotably engaging the left arm first end to the central body;
      iv. a right arm comprising a right arm first end and a right second end; and
      v. a right arm fastener for pivotably engaging the right arm first end to the central body;
   b. a top adhesive for attaching the upper support to the upper monitor portion;
   c. a bottom caddy comprising a modified Z-shape for engaging the lower monitor portion and adapted for holding desk tools and wherein the bottom caddy comprises:
      i. a strengthening side connected to an attaching side;
      ii. a front face connected to the attaching side; and
      iii. a lip connected to the front face;
   d. a bottom adhesive for attaching the bottom caddy to the lower monitor portion.

14. The system of claim 13, wherein the right slide further comprises a handle.

15. A system for organizing a computer monitor with an upper monitor portion and a lower monitor portion comprising:
   a. an upper support comprising:
      i. a central body comprising a C-shape and adapted for engaging the upper monitor portion without impairing computer monitor viewing;
      ii. a left arm comprising a left arm first end and a left arm second end;
      iii. a left arm fastener for pivotably engaging the left arm first end to the central body;
      iv. a right arm comprising a right arm first end and a right arm second end; and
      v. a right arm fastener for pivotably engaging the right arm first end to the central body, a right arm holder or a left arm holder swivels from an in-use position to an out-of-use position, and wherein the right arm holder or left arm holder is connected to the inside of the right arm or left arm, respectively, and comprises a Y-shaped paper holder that enables a user to slide paper between the right arm or left arm and the Y-shaped paper holder by tension;
b. a top adhesive for attaching the upper support to the upper monitor portion;
c. a bottom caddy comprising a modified Z-shape for engaging the lower monitor portion and adapted for holdings desk tools and wherein the bottom caddy comprises:
  i. a strengthening side connected to an attaching side;
  ii. a front face connected to the attaching side; and
  iii. a lip connected to the front face;
d. a bottom adhesive for attaching the bottom caddy to the lower monitor portion.

16. A system for organizing a computer monitor having an upper monitor portion and a lower monitor portion wherein:
a. a computer monitor;
b. an upper support comprising:
  i. a central body comprising a C-shape for engaging the upper monitor portion without impairing computer monitor viewing;
  ii. a left segmented arm comprising a first left segment end and a second left segmented end;
  iii. a first left segment secured to the second left segment end of the left segmented arm with a first left segment fastener, and wherein the first left segment comprises a first left segment top end and a first left segment bottom end;
  iv. a second left segment secured to the first left segment bottom end with a second left segment fastener;
  v. a clip;
  vi. a right segmented arm comprising a first segment end and a second segmented end;
  vii. a first right segment secured to the second segmented end of the right segmented arm with a first right segment fastener, and wherein the first right segment comprises a first right segment top end and a first right segment bottom end; and
  viii. a second right segment secured to the first right segment bottom end with a second right segment fastener;
c. a bottom caddy having a modified Z-shape for sliding engaging the lower monitor portion and adapted for holding desk implements, and wherein the bottom caddy comprises a strengthening side connected to an attaching side a front face connected to the attaching side and a lip; and
d. a top adhesive for attaching the upper support to the upper monitor portion; and
a. a bottom adhesive for attaching the bottom caddy to the lower monitor portion.

* * * * *